(12) United States Patent
Kim et al.

(10) Patent No.: US 8,571,304 B2
(45) Date of Patent: Oct. 29, 2013

(54) METHOD AND APPARATUS FOR GENERATING STEREOSCOPIC IMAGE FROM TWO-DIMENSIONAL IMAGE BY USING MESH MAP

(75) Inventors: Jong-Ryul Kim, Seoul (KR); Ju-Hyae Kim, Seoul (KR); Hyoung-Woo Kim, Seoul (KR); Kwan-Woo Kim, Seoul (KR)

(73) Assignees: Real Image Corp., Seoul (KR); Venture 3D, Inc., Culver City, CA (US)

( * ) Notice: Subject to any disclaimer, the term of this patent is extended or adjusted under 35 U.S.C. 154(b) by 865 days.

(21) Appl. No.: 12/522,382

(22) PCT Filed: Jan. 2, 2008

(86) PCT No.: PCT/KR2008/000015
§ 371 (c)(1),
(2), (4) Date: Nov. 30, 2009

(87) PCT Pub. No.: WO2008/084937
PCT Pub. Date: Jul. 17, 2008

(65) Prior Publication Data
US 2010/0086199 A1    Apr. 8, 2010

(30) Foreign Application Priority Data

| Jan. 10, 2007 | (KR) | .......................... 10-2007-0002883 |
| Mar. 19, 2007 | (KR) | .......................... 10-2007-0026568 |
| Apr. 6, 2007 | (KR) | .......................... 10-2007-0034321 |

(51) Int. Cl.
*G06K 9/00* (2006.01)
(52) U.S. Cl.
USPC .......................................... 382/154; 345/419
(58) Field of Classification Search
USPC .......................................... 382/154; 345/419
See application file for complete search history.

(56) References Cited

U.S. PATENT DOCUMENTS 6,515,659 B1 *    2/2003    Kaye et al. .................... 345/419

FOREIGN PATENT DOCUMENTS

| JP | 1007736 | 1/1989 |
| JP | 7288850 | 10/1995 |
| JP | 7307961 | 11/1995 |
| JP | 7322300 | 12/1995 |
| JP | 9054376 | 2/1997 |
| JP | 9265056 | 10/1997 |
| JP | 2006186510 | 7/2006 |
| JP | 2006186795 | 7/2006 |

* cited by examiner

*Primary Examiner* — John Strege
(74) *Attorney, Agent, or Firm* — Lee, Hong, Degerman, Kang & Waimey

(57) ABSTRACT

Provided are a method and apparatus for generating a stereoscopic image from a two-dimensional (2D) image by using a mesh map and a computer readable recording medium having recorded thereon a computer program for executing the method. Also provided are a method and apparatus for generating a stereoscopic image by reading a 2D image, displaying the 2D image and a mesh map by overlapping the 2D image and the mesh map, and editing mesh shapes and depth information (depth values) of the mesh map by a user, and a computer readable recording medium having recorded thereon a computer program for executing the method. The method of generating a stereoscopic image includes receiving a 2D image; displaying the 2D image and a mesh map by overlapping the 2D image and the mesh map; editing mesh shapes and depth information (depth values) of the mesh map by a user in accordance with shapes of a displayed image; calculating relative depth information of pixels included in the 2D image in accordance with the mesh shapes and the depth information of the edited mesh map; and generating a stereoscopic image file by using the calculated relative depth information of the 2D image. The present invention may be used in a system for generating a stereoscopic image from a 2D image including a general still image or moving picture.

26 Claims, 4 Drawing Sheets

METHOD AND APPARATUS FOR GENERATING STEREOSCOPIC IMAGE FROM TWO-DIMENSIONAL IMAGE BY USING MESH MAP

CROSS-REFERENCE TO RELATED APPLICATIONS

This application is the National Stage filing under 35 U.S.C. 371 of International Application No. PCT/KR2008/000015, filed on Jan. 2, 2008, which claims the benefit of earlier filing date and right of priority to Korean Patent Application No. 10-2007-0002883, filed on Jan. 10, 2007, Korean Patent Application No. 10-2007-0026568, filed on Mar. 19, 2007, and Korean Patent Application No. 10-2007-0034321, filed on Apr. 6, 2007, the contents of all of which are incorporated by reference herein in their entireties.

TECHNICAL FIELD

The present invention relates to a method and apparatus for generating a stereoscopic image and a computer readable recording medium having recorded thereon a computer program for executing the method, and more particularly, to a method and apparatus for generating a stereoscopic image from a two-dimensional (2D) image by using a mesh map, in which a 2D digital image is read, the 2D image and a mesh map are displayed by overlapping the 2D image and the mesh map, mesh shapes and depth information (depth values) of the mesh map are edited by a user, relative depth information of pixels included in the 2D image is calculated in accordance with the mesh shapes and the depth information, and a stereoscopic image file is generated by using the calculated relative depth information of the 2D image, and a computer readable recording medium having recorded thereon a computer program for executing the method.

In the present invention, the 2D image includes a general still image or moving picture.

In the present invention, preferably, the 2D image may be received in a digital format. However, the 2D image may be received in an analog format and be converted into the digital format by using a well-known method.

In the present invention, the apparatus for generating a stereoscopic image may be implemented as hardware. However, preferably, the apparatus may be implemented as stereoscopic image generation software.

Although the present will be described on the assumption that the present invention is applied to a computer, the present invention is not limited thereto. The present invention may be applied to any electronic device such as a smart mobile phone.

BACKGROUND ART

In general, when a human views an object nearby, a three-dimensional (3D) effect occurs due to a binocular disparity of both eyes which are separated from each other by approximately 65 mm in the horizontal direction. That is, both eyes view two different images of an actual object, the two images are transferred to the brain through the retina and the optic nerve, the visual cortex (an area of the cerebral cortex at the back of the brain which processes visual information) combines the two images, and thus a 3D or spatial effect occurs in relation to the object.

A virtual 3D display device is a system that provides a virtual 3D effect in a 2D display device having a particular tool that uses the phenomenon of binocular disparity. That is, the virtual 3D effect occurs by simultaneously displaying two binocular images on a screen so that each binocular image is viewed by each eye, respectively. In order to display the two binocular images on a screen, in most cases, the virtual 3D display device displays the two binocular images by alternately arranging pixel lines of the two binocular images or alternately displays the whole two binocular images with a predetermined time delay. When the two binocular images are displayed on the screen, a right-eye-view image is viewed by a right eye and a left-eye-view image is viewed by a left eye due to a hardware structure of a display device in an autostereoscopic method, and a right-eye-view image is blocked from being viewed by a left eye and a left-eye-view image is blocked from being viewed by a right eye by using special glasses such as polarizing glasses or liquid crystal display (LCD) shutter glasses in a stereoscopic method.

Meanwhile, a stereoscopic image for virtual 3D display may be generated by using a binocular shooting method in which two cameras, which are separated from each other by approximately 65 mm, take different images at the same time. However, by using the binocular shooting method, complicated and inconvenient considerations and processes are additionally required for shooting and editing and thus time and costs are greatly increased compared to a normal shooting method of moving pictures. Therefore, the binocular shooting method of moving pictures is not widely used except for in a few special cases.

Recently, in accordance with the mass production of high-quality large-scale flat panel LCD display devices, hardware technology, such as a virtual 3D display device, has been highly developed and is expected to become widely popular in the near future. However, 3D industries have not developed further, since there are insufficient 3D contents, namely stereoscopic moving pictures which can be easily and generally utilized by public users.

Accordingly, a technology for converting a common 2D image, which includes a general still image or moving picture into a stereoscopic image at low cost and in a short time, using an image-processing computer software or hardware is required. That is, a technology for converting a monocular source (common 2D digital image), which is taken by using one camera, into a stereoscopic image having a 3D effect of comparing quality to that taken by using a binocular shooting method is required.

DISCLOSURE OF INVENTION

Technical Problem

Technical Solution

The present invention provides a method and apparatus for generating a stereoscopic image from a two-dimensional (2D) image by using a mesh map and a computer readable recording medium having recorded thereon a computer program for executing the method.

The present invention also provides a method and apparatus for generating a stereoscopic image by reading a 2D image, displaying the 2D image and a mesh map by overlapping the 2D image and the mesh map, and editing mesh shapes and depth information (depth values) of the mesh map by a user, and a computer readable recording medium having recorded thereon a computer program for executing the method.

The other objects and advantages of the present invention can be understood and will become clearer through embodiments disclosed in the detailed description of the invention. In addition, it can be understood that the objects and advantages of the present invention will be implemented by constructions and features disclosed in the claims and a combination thereof.

According to an aspect of the present invention, there is provided an apparatus for generating a stereoscopic image from a two-dimensional (2D) image by using a mesh map, the apparatus including a reception unit for receiving the 2D image including a still image or a moving picture from an external device and receiving mesh shapes and depth information (depth values) of a mesh map which are edited by a user; a screen reference unit for displaying the 2D image and the mesh map by overlapping the 2D image and the mesh map; an information management unit for managing the mesh shapes and the depth information (depth values) of the mesh map that is edited by the user in accordance with shapes of a displayed image; a calculation unit for calculating relative depth information (depth values) of pixels included in the 2D image in accordance with the mesh shapes and the depth information of the edited mesh map; and a stereoscopic image generation unit for generating a stereoscopic image file by using the calculated relative depth information of the 2D image.

Advantageous Effects

According to the present invention, a stereoscopic image may be generated from a 2D image by using a mesh map.

That is, according to the present invention, a stereoscopic image may be generated from a 2D image by reading the 2D image, displaying the 2D image and a mesh map by overlapping the 2D image and the mesh map, and editing mesh shapes and depth information (depth values) of the mesh map by a user.

Thus, a common 2D image, which includes a general still image or moving picture may be converted into a stereoscopic image having a 3D effect, at a low cost and in a short time, by using a image-processing computer software or hardware, as if the stereoscopic image is taken by using a binocular shooting method.

DESCRIPTION OF DRAWINGS

The above and other features and advantages of the present invention will become more apparent by describing in detail exemplary embodiments thereof with reference to the attached drawings in which.

BEST MODE

Figure 1:
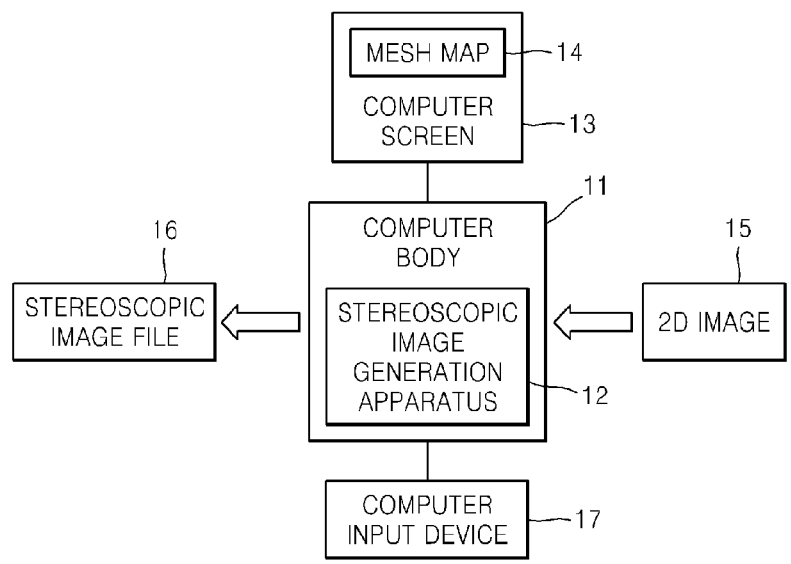
FIG. 1 is a schematic diagram of a stereoscopic image generation system including a stereoscopic image generation apparatus, according to an embodiment of the present invention.

According to an aspect of the present invention, there is provided an apparatus for generating a stereoscopic image from a two-dimensional (2D) image by using a mesh map, the apparatus including a reception unit for receiving the 2D image including a still image or a moving picture from an external device and receiving mesh shapes and depth information (depth values) of a mesh map which are edited by a user; a screen reference unit for displaying the 2D image and the mesh map by overlapping the 2D image and the mesh map; an information management unit for managing the mesh shapes and the depth information (depth values) of the mesh map that is edited by the user in accordance with shapes of a displayed image; a calculation unit for calculating relative depth information (depth values) of pixels included in the 2D image in accordance with the mesh shapes and the depth information of the edited mesh map; and a stereoscopic image generation unit for generating a stereoscopic image file by using the calculated relative depth information of the 2D image.

The screen reference unit may determine whether a virtual three-dimensional (3D) display device is included in a computer; and generate a stereoscopic image by applying the mesh shapes and the depth information of the mesh map that is being currently edited, to the 2D image and displays the stereoscopic image and the mesh map by overlapping the stereoscopic image and the mesh map, if the virtual 3D display device is included in the computer.

According to another aspect of the present invention, there is provided an apparatus for generating a stereoscopic image from a two-dimensional (2D) image by using a mesh map, the apparatus including a reception unit for receiving the 2D image from an external device and receiving mesh shapes and depth information (depth values) of a mesh map, which are edited by a user; a screen reference unit for generating a stereoscopic image by applying mesh shapes and depth information (depth values) of a mesh map, that is being currently edited, to the 2D image and displaying the stereoscopic image and the mesh map by overlapping the stereoscopic image and the mesh map; an information management unit for managing the mesh shapes and the depth information of the mesh map that is edited by the user in accordance with shapes of a displayed image; a calculation unit for calculating relative depth information (depth values) of pixels included in the 2D image in accordance with the mesh shapes and the depth information of the edited mesh map; and a stereoscopic image generation unit for generating a stereoscopic image file by using the calculated relative depth information of the 2D image.

The information management unit may automatically modify the mesh shapes of a neighboring image and automatically calculate the depth information of meshes included in the mesh map of the neighboring image in accordance with differences between the neighboring image and a current image, based on the mesh shapes and the depth information of the edited mesh map of the current image, if the received 2D image is a moving picture.

According to another aspect of the present invention, there is provided a method of generating a stereoscopic image from a two-dimensional (2D) image by using a mesh map, the method including receiving the 2D image; displaying the 2D image and a mesh map by overlapping the 2D image and the mesh map; editing mesh shapes and depth information (depth values) of the mesh map by a user in accordance with shapes of the displayed image; calculating relative depth information (depth values) of pixels included in the 2D image in accordance with the mesh shapes and the depth information of the edited mesh map; and generating a stereoscopic image by using the calculated relative depth information of the 2D image.

The method may further include determining whether a virtual three-dimensional (3D) display device is included in a computer; and generating a stereoscopic image by applying the mesh shapes and the depth information of the mesh map that is being currently edited, to the 2D image and displaying the stereoscopic image and the mesh map by overlapping the stereoscopic image and the mesh map, if the virtual 3D display device is included in the computer.

According to another aspect of the present invention, there is provided a method of generating a stereoscopic image from a two-dimensional (2D) image by using a mesh map, the method including receiving the 2D image; generating a stereoscopic image by applying mesh shapes and depth information (depth values) of a mesh map that is being currently edited, to the 2D image and displaying the stereoscopic image and the mesh map by overlapping the stereoscopic image and the mesh map; editing the mesh shapes and the depth information of the mesh map by a user in accordance shapes of a displayed image; calculating relative depth information (depth values) of pixels included in the 2D image in accordance with the mesh shapes and the depth information of the edited mesh map; and generating a stereoscopic image file by using the calculated relative depth information of the 2D image.

Any one of the above methods may further include automatically modifying the mesh shapes of a neighboring image and automatically calculating the depth information of meshes included in the mesh map of the neighboring image in accordance with differences between the neighboring image and a current image, based on the mesh shapes and the depth information of the edited mesh map of the current image, if the received 2D image is a moving picture.

According to another aspect of the present invention, there is provided a computer readable recording medium having recorded thereon a computer program for executing functions of a stereoscopic image generation apparatus comprising a processor, the functions including receiving a two-dimensional (2D) image; displaying the 2D image and a mesh map by overlapping the 2D image and the mesh map; editing mesh shapes and depth information (depth values) of the mesh map by a user in accordance with shapes of a displayed image; calculating relative depth information (depth values) of pixels included in the 2D image in accordance with the mesh shapes and the depth information of the edited mesh map; and generating a stereoscopic image by using the calculated relative depth information of the 2D image.

The functions may further include determining whether a virtual three-dimensional (3D) display device is included in a computer; and generating a stereoscopic image by applying the mesh shapes and the depth information of the mesh map that is being currently edited, to the 2D image and displaying the stereoscopic image and the mesh map by overlapping the stereoscopic image and the mesh map, if the virtual 3D display device is included in the computer.

According to another aspect of the present invention, there is provided a computer readable recording medium having recorded thereon a computer program for executing functions of a stereoscopic image generation apparatus comprising a processor, the functions including receiving a two-dimensional (2D) image; generating a stereoscopic image by applying mesh shapes and depth information (depth values) of a mesh map that is being currently edited, to the 2D image and displaying the stereoscopic image and the mesh map by overlapping the stereoscopic image and the mesh map; editing the mesh shapes and the depth information of the mesh map by a user in accordance with shapes of a displayed image; calculating relative depth information (depth values) of pixels included in the 2D image in accordance with the mesh shapes and the depth information of the edited mesh map; and generating a stereoscopic image file by using the calculated relative depth information of the 2D image.

The functions may further include automatically modifying the mesh shapes of a neighboring image and automatically calculating the depth information of meshes included in the mesh map of the neighboring image in accordance with differences between the neighboring image and a current image, based on the mesh shapes and the depth information of the edited mesh map of the current image, if the received 2D image is a moving picture.

As described above, according to the present invention, a stereoscopic image file is generated by installing stereoscopic image generation software (a stereoscopic image generation apparatus) to a computer, reading a 2D digital image including a general still image or moving picture, displaying the 2D image and a mesh map by overlapping the 2D image and the mesh map, editing mesh shapes and depth information (depth values) of the mesh map by a user, and calculating relative depth information of pixels included in the 2D image in accordance with the mesh shapes and the depth information which are edited by the user.

MODE FOR INVENTION

The objects and advantages of the present invention can be understood and become clearer through embodiments disclosed in the detailed description of the invention. Accordingly, the technical features of the present invention can be implemented by those of ordinary skill in the art.

In the following description of the present invention, a detailed description of known functions and configurations incorporated herein will be omitted when it may make the subject matter of the present invention unclear.

Hereinafter, the present invention will be described in detail by explaining embodiments of the invention with reference to the attached drawings.

FIG. 1 is a schematic diagram of a stereoscopic image generation system including a stereoscopic image generation apparatus 12, according to an embodiment of the present invention.

Referring to FIG. 1, the stereoscopic image generation system includes a computer body 11, a computer screen 13, and a computer input device 17.

The computer body 11 is a general computing system including a central processing unit (CPU), data storage such as random access memory (RAM), read-only memory (ROM), and a hard disk (HDD), and various interfaces. A typical personal computer (PC), a notebook computer, or a workstation may be used as the computer body 11. The computer body 11 may promptly and accurately process data by performing a large amount of mathematical calculation in a short time. In general, a microprocessor (for example, manufactured by 'Intel Corporation') is used as the CPU of the computer body 11. A display device, an output device such as a monitor, and an input device such as a mouse and a keyboard are connected to the computer body 11 in a wired or wireless environment.

The display device connected to the computer body 11 includes the computer screen 13. Here, the display device may be of various types such as a general cathode ray tube (CRT) type, a liquid crystal display (LCD) type, and a plasma display panel (PDP) type. If the display device is a virtual three-dimensional (3D) display device, a stereoscopic image including a left-eye-view image and a right-eye-view image can be displayed on the computer screen 13 so that a 3D or spatial effect may be provided to a user.

Meanwhile, the stereoscopic image generation apparatus 12 is implemented as, for example, stereoscopic image generation software that may be installed to the HDD, be moved to memory such as the RAM by the user instruction and be executed by the CPU.

In this case, in order to generate the stereoscopic image, the stereoscopic image generation apparatus 12 which is installed to the computer body 11 reads or receives a two-dimensional (2D) digital image 15 including a general still image or moving picture, assuming it is the right-eye-view image. Then, the stereoscopic image generation apparatus 12 displays the 2D image 15 and a mesh map 14 on the computer screen 13 by overlapping the 2D image 15 and the mesh map 14.

Here, the mesh map 14 is composed of a plurality of meshes and each mesh has four corners. A corner of a mesh includes data regarding a position (x and y coordinates) on the computer screen 13 and a relative depth value (z coordinate). In this case, like the x and y coordinates which are a relative position on the computer screen, a depth value (depth information) of each corner is a relative z coordinate that is converted based on the size (pixel number) of the 2D image 15 instead of the absolute depth value of an object.

When the stereoscopic image generation apparatus 12 displays the 2D image 15 and the mesh map 14 on the computer screen 13 by overlapping the 2D image 15 and the mesh map 14, the user may edit mesh shapes by modifying positions of corners of the meshes so as to correspond to shapes of the 2D image 15 by using the computer input device 17 such as a mouse and a keyboard and may enter depth values of corners of the meshes in accordance with subjective perspectives of a displayed (2D) image 15. Thus, the mesh map 14 is edited in accordance with shapes of the displayed image by the user. In this case, the stereoscopic image generation apparatus 12 may manipulate the mesh map 14 into a final version by modifying the mesh map by the user, displaying the modified mesh map 14 on the computer screen 13 so as to allow the user to re-edit the mesh shapes and the depth values, and repeating the modifying and the displaying in accordance with shapes of the displayed (2D) image.

Meanwhile, if a virtual 3D display device is included in the computer 11, a stereoscopic image may be generated in accordance with the mesh shapes and the depth values of the mesh map 14 that is being currently edited by selective settings of the user and the generated stereoscopic image and the mesh map 14 may be displayed on the computer screen 13. Thus, the user may edit the mesh shapes and the depth values of the mesh map 14 while the stereoscopic image is being displayed, so as to edit the mesh map 14 in accordance with shapes of the displayed (3D) image.

The stereoscopic image generation apparatus 12 receives the mesh shapes and the depth values of the mesh map 14 as described above so as to generate a stereoscopic image file 16 by calculating relative depth values of all pixels of the 2D image 15. That is, the stereoscopic image generation apparatus 12 generates a left-eye-view image by moving each pixel horizontally of a right-eye-view image that is the 2D image 15 to the left or right side of the computer screen 13 in accordance with the calculated relative depth values (depth information) so as to generate the stereoscopic image file 16, where a pixel is moved to the right side if the calculated relative depth value (depth information) of the pixel is positive (that is the pixel is prominent) and a pixel is moved to the left side if the calculated relative depth value of the pixel is negative (that is the pixel is depressed). The stereoscopic image file 16 may be generated by alternately arranging pixel lines of the left-eye-view image and the right-eye-view image. Here, the pixel lines of the left-eye-view image and the right-eye-view image may be alternately arranged in a horizontal or vertical direction. Alternatively, only the left-eye-view image may be generated into the stereoscopic image 16.

Figure 2:
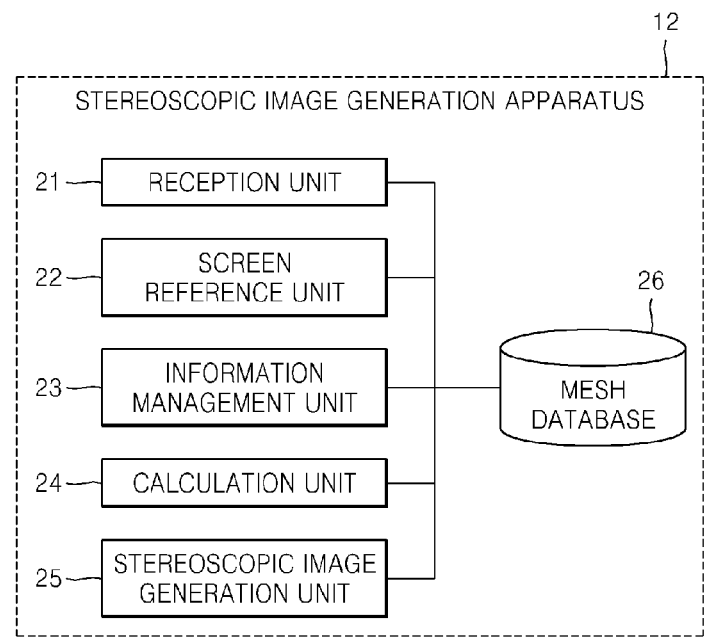
FIG. 2 is a detailed block diagram of the stereoscopic image generation apparatus illustrated in FIG. 1, according to an embodiment of the present invention.

FIG. 2 is a detailed block diagram of the stereoscopic image generation apparatus 12 illustrated in FIG. 1, according to an embodiment of the present invention.

Referring to FIG. 2, the stereoscopic image generation apparatus 12 includes a reception unit 21 for receiving a 2D image from an external device and receiving mesh shapes and depth information (depth values) of a mesh map which are edited by a user, a screen reference unit 22 for displaying the 2D image and the mesh map received by the reception unit 21 on a computer screen by overlapping the 2D image and the mesh map, an information management unit 23 for storing and managing the mesh shapes and the depth values of the mesh map that is edited by the user based on shapes of the 2D image displayed by the screen reference unit 22, a calculation unit 24 for calculating relative depth values of all pixels of the 2D image in accordance with the mesh shapes and the depth values of the edited mesh map, and a stereoscopic image generation unit 25 for generating a stereoscopic image file by using the relative depth values (depth information) of the 2D image which are calculated by the calculation unit 24.

Each element of the stereoscopic image generation apparatus 12 will now be described in more detail.

The reception unit 21 receives a 2D digital image from an external device and receives mesh shapes and depth values of a mesh map which are edited by a user. That is, the reception unit 21 reads or receives the 2D image including a general still image or moving picture and then transfers the 2D image to a memory in a computer body. As described above in FIG. 1, the mesh shapes and the depth values of the mesh map which are edited by the user. Here, most moving pictures are compressed and thus the reception unit 21 may further decompress the 2D image. If the 2D image is input in an analog file, the reception unit 21 may primarily convert the analog file into a digital file by using a well-known method.

The screen reference unit 22 is a module for displaying the 2D image input by the reception unit 21 and the mesh map which is stored, for example, in a mesh database 26, on a computer screen by overlapping the 2D image and the mesh map.

According to another embodiment of the present invention, if a virtual 3D display device is included in the computer, the screen reference unit 22 generates a stereoscopic image by applying the mesh shapes and the depth values of the mesh map that is being currently edited by selective settings of the user, to the 2D image that is received by the reception unit 22 and displays the generated stereoscopic image and the mesh map on the computer screen by overlapping the stereoscopic image and the mesh map. That is, if a virtual 3D display device is included in the computer, the stereoscopic image may be generated in accordance with the mesh shapes and the depth values of the mesh map that is being currently edited by selective settings of the user and the generated stereoscopic image and the mesh map may be displayed on the computer screen by overlapping the stereoscopic image and the mesh map. Thus, the user may edit the mesh shapes and the depth values of the mesh map by using the reception unit 21 while the stereoscopic image is being displayed, so as to edit the mesh map in accordance with shapes of the displayed (3D) image.

The information management unit 23 is a module for storing and managing the mesh shapes and the depth values of the mesh map that is edited by the user using the reception unit 21 by manipulating a computer input device such as a mouse and a keyboard. Here, the mesh shapes and the depth values are positions and depth values of four corners of meshes included in the mesh map, respectively. In this case, the user edits the mesh shapes and the depth values on the computer screen in accordance with shapes of the 2D image displayed by the screen reference unit 22. Then, the mesh shapes and the depth values of the edited mesh map are stored and managed by using, for example, the mesh database 26.

Also, if the 2D image input by the reception unit 21 is a moving picture, the information management unit 23 may further automatically modify the mesh shapes of a neighboring image and automatically calculate the depth values of the neighboring image in accordance with differences between the neighboring image and a current image, based on the mesh shapes and the depth values of the edited mesh map of the current image.

The calculation unit 24 is a module for calculating relative depth values (depth information) of all pixels of the 2D image in accordance with the mesh shapes and the depth values of the edited mesh map. That is, the calculation unit 24 calculates a relative depth value of each pixel by using depth values and distance rates of four corners of a mesh including the pixel. The calculating of the relative depth values will be described in detail later with reference to FIG. 3.

The stereoscopic image generation unit 25 generates a stereoscopic image file by using the relative depth values of the 2D image which are calculated by the calculation unit 24. That is, the stereoscopic image generation unit 25 generates a left-eye-view image by moving each pixel of the right-eye-view image that is the 2D image, input by the reception unit 21 to the left or right side of the computer screen in accordance with the relative depth values (depth information) calculated by the calculation unit 24, where a pixel is moved to the right side if the calculated relative depth value of the pixel is positive (prominent) and a pixel is moved to the left side if the calculated relative depth value of the pixel is negative (depressed), so as to generate the stereoscopic image file.

The stereoscopic image file may be generated by alternately arranging pixel lines of the left-eye-view image and the right-eye-view image. Here, the pixel lines of the left-eye-view image and the right-eye-view image may be alternately arranged in a horizontal or vertical direction. Alternatively, only the left-eye-view image may be generated into the stereoscopic image.

For example, when a pixel of the right-eye-view image is moved to the left or right side of the computer screen in accordance with the relative depth value, assuming that there is a distance of 65 mm between the left and right eyes and the distance between the both eyes and the surface of the computer screen is 70 cm, if a pixel of the right-eye-view image has a depth value corresponding to a slightly prominent position of the computer screen, the corresponding pixel of the left-eye-view image is moved at a position rotated approximately 5° to the right of a longitudinal axis at the center of the right-eye-view. [360°×6.5 cm/(2×3.14×70 cm)≈5°] Thus, to generate the left-eye-view image, a pixel is moved horizontally to the right side if the calculated relative depth value of the pixel is positive (prominent) and a pixel is moved horizontally to the left side if the calculated relative depth value of the pixel is negative (depressed).

Figure 3:
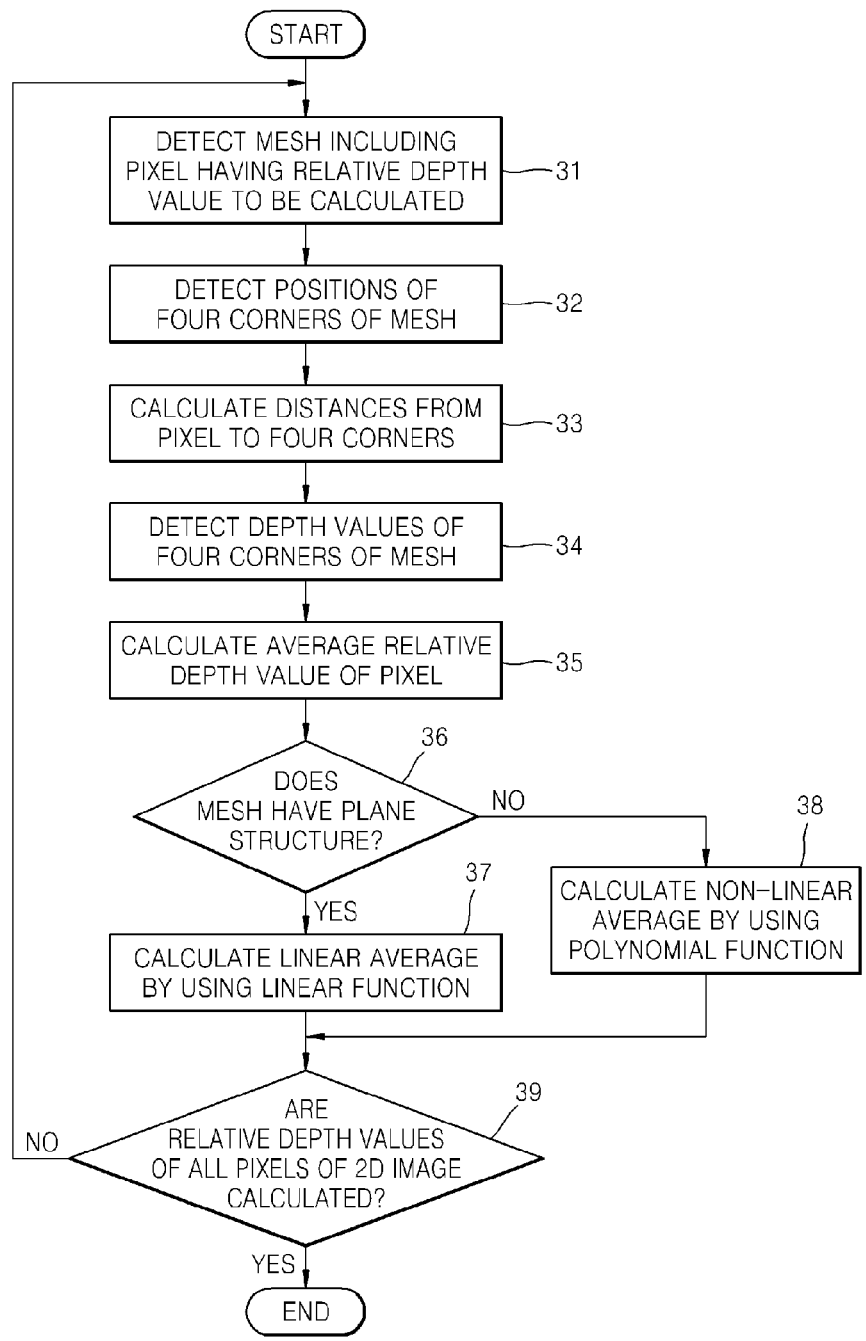
FIG. 3 is a detailed flowchart of a method of calculating relative depth values of pixels when a stereoscopic image is generated from a 2D image by using a mesh map, according to an embodiment of the present invention.

FIG. 3 is a detailed flowchart of a method of calculating relative depth values of pixels when a stereoscopic image is generated from a 2D image by using a mesh map, according to an embodiment of the present invention. By using the method illustrated in FIG. 3, a stereoscopic image generation apparatus may calculate the relative depth values of all pixels of the 2D image in accordance with mesh shapes and depth values of an edited mesh map. Here, the mesh shapes and the depth values are positions and depth values of four corners of meshes included in the mesh map, respectively.

Initially, a mesh including a pixel having a relative depth value to be calculated is detected in operation 31. That is, a mesh of the edited mesh map, which includes the pixel having a relative depth value to be calculated, is detected from the mesh database. The detecting of the mesh may be performed because the mesh map is edited by the user and the mesh shapes and the depth values are stored in the mesh database.

Then, positions (x and y coordinates) of four corners of the mesh are detected in operation 32.

Then, distances from the pixel to the four corners are calculated in operation 33. That is, distances from a position (x and y coordinates) of the pixel to the positions (x and y coordinates) of the four corners of the mesh are calculated.

Then, depth values (z coordinates) of the four corners of the mesh which are edited by the user are detected in operation 34.

Then, an average relative depth value of the pixel is calculated by using the depth values (z coordinates) of the four corners of the mesh. That is, the relative depth value of the pixel is calculated by inverse-proportionally multiplying the depth values by distance rates of the four corners of the mesh from the pixel in operation 35 and averaging the inverse-proportionally multiplied values in the following operations.

In this case, it is determined whether the mesh has a plane structure in operation 36. If the mesh has a plane structure, a linear average value is calculated by using a linear function in operation 37. If the mesh has a convex or concave structure instead of a plane structure, a non-linear average value is calculated by using a polynomial function in operation 38.

Then, it is determined whether relative depth values of all pixels of the 2D image are calculated in operation 39. If the relative depth values of all pixels of the 2D image are not calculated, the method returns to operation 31. If the relative depth values of all pixels of the 2D image are not calculated, the method comes back to operation 31. If the relative depth values of all pixels of the 2D image are calculated, the method ends.

Figure 4:
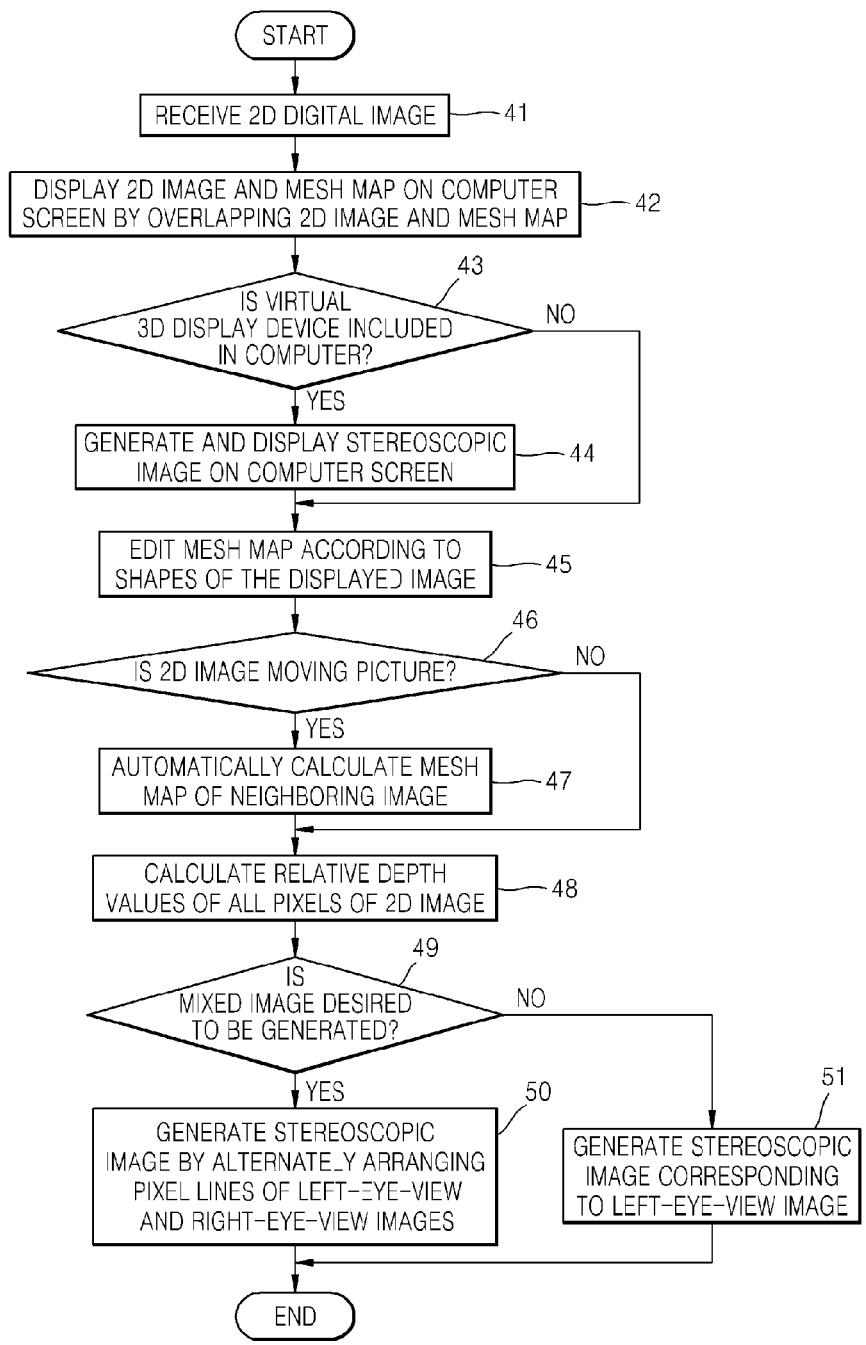
FIG. 4 is a detailed flowchart of a method of generating a stereoscopic image from a 2D image when a stereoscopic image is generated from a 2D image by using a mesh map, according to an embodiment of the present invention.

FIG. 4 is a detailed flowchart of a method of generating a stereoscopic image from a 2D image when a stereoscopic image is generated from a 2D image by using a mesh map, according to an embodiment of the present invention.

Initially, a stereoscopic image generation apparatus such as stereoscopic image generation software, which is installed to a computer, receives a 2D digital image including a general still image or moving picture in operation 41.

Then, the stereoscopic image generation apparatus displays the 2D image and a mesh map on a computer screen by overlapping the 2D image and the mesh map in operation 42.

In this case, it is determined whether a virtual 3D display device is included in the computer in operation 43. If a virtual 3D display device is not included in the computer, the method proceeds to operation 45. If a virtual 3D display device is included in the computer, a stereoscopic image is generated in accordance with mesh shapes and depth values of the mesh map that is being currently edited and the generated stereoscopic image and the mesh map are displayed on the computer screen, in operation 44, before the method proceeds to operation 45. That is, if a virtual 3D display device is included in the computer, the stereoscopic image is generated by applying the mesh shapes and the depth values of the mesh map that is being currently edited by selective settings of a user, to the 2D image and the generated stereoscopic image and the mesh map are displayed on the computer screen.

Meanwhile, according to another embodiment of the present invention, if a virtual 3D display device is not included and only a 2D display device is included in the computer, the method directly proceeds from operation 42 to operation 45 without performing operations 43 and 44.

Then, the mesh map is edited by the user in accordance with shapes of the displayed image by manipulating a computer input device such as a mouse and a keyboard in operation 45. Here, for example, the user modifies the mesh shapes of the mesh map in accordance with shapes of the displayed image and enters the depth values of four corners of meshes included in the mesh map in accordance with subjective perspectives of the displayed image.

Then, it is determined whether the received 2D image is a moving picture in operation 46. If the received 2D image is a still image, the method proceeds to operation 48. If the received 2D image is a moving picture, the stereoscopic image generation apparatus automatically modifies the mesh shapes of a neighboring image and automatically calculates the depth values of the meshes included in the mesh map of the neighboring image in accordance with differences between the neighboring image and a current image, based on the mesh shapes and the depth values of the edited mesh map of the current image, in operation 47, before the method proceeds to operation 48. Here, the mesh shapes and the depth values of the mesh map of the neighboring image may be automatically calculated as long as the neighboring image is not completely different from the current image.

Then, the stereoscopic image generation apparatus calculates relative depth values of all pixels of the 2D image in accordance with the mesh shapes and the depth values of the edited mesh map in operation 48. That is, a relative depth value of each pixel is calculated by using depth values and distance rates of four corners of a mesh including the pixel, in accordance with the mesh shapes and the depth values of the edited mesh map. The calculating of the relative depth values is described in detail above with reference to FIG. 3.

Then, the stereoscopic image generation apparatus generates a stereoscopic image file by using the calculated relative depth values of all pixels of the 2D image in operations 49 through 51.

That is, the stereoscopic image generation apparatus generates a left-eye-view image by moving each pixel of a right-eye-view image that is the 2D image, to the left or right side of the computer screen in accordance with the calculated relative depth values, where a pixel is moved to the right side if the calculated relative depth value of the pixel is positive (prominent) and a pixel is moved to the left side if the calculated relative depth value of the pixel is negative (depressed), so as to generate the stereoscopic image file. The stereoscopic image file may be generated by alternately arranging pixel lines of the left-eye-view image and the right-eye-view image. Here, the pixel lines of the left-eye-view image and the right-eye-view image may be alternately arranged in a horizontal or vertical direction. Alternatively, only the left-eye-view image may be generated into the stereoscopic image.

Figure 5:
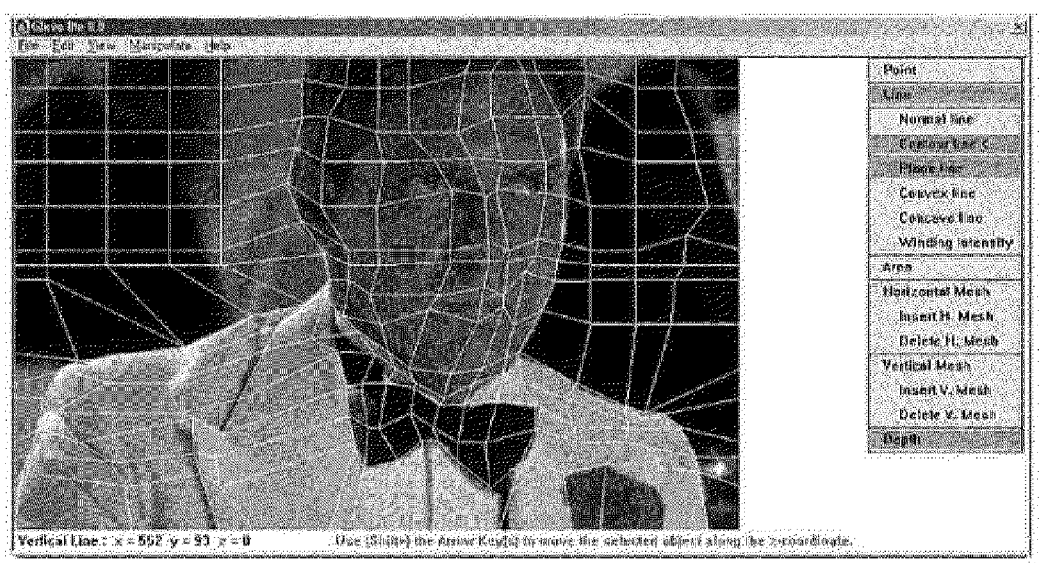
FIG. 5 is a photographic image of an example of a computer screen when a stereoscopic image generation apparatus is implemented as stereoscopic image generation software, according to an embodiment of the present invention.

FIG. 5 is a photographic image of an example of a computer screen when a stereoscopic image generation apparatus is implemented as stereoscopic image generation software, according to an embodiment of the present invention.

The invention can also be embodied as computer readable codes on a computer readable recording medium. Examples of the computer readable recording medium include read-only memory (ROM), random-access memory (RAM), CD-ROMs, floppy disks, hard disks (HDDs), and magneto-optical disks.

As described above, according to the present invention, a stereoscopic image may be generated from a 2D image by using a mesh map.

That is, according to the present invention, a stereoscopic image may be generated from a 2D image by reading the 2D image, displaying the 2D image and a mesh map by overlapping the 2D image and the mesh map, and editing mesh shapes and depth information (depth values) of the mesh map by a user.

Thus, a common 2D image, which includes a general still image or moving picture may be converted into a stereoscopic image having a 3D effect, at a low cost and in a short time, by using a image-processing computer software or hardware, as if the stereoscopic image is taken by using a binocular shooting method.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the de tailed description of the invention but by the appended claims, and all differences within the scope will be construed as being included in the present invention.

The invention claimed is:

1. An apparatus for generating a stereoscopic image from a two-dimensional (2D) image by using a mesh map, the apparatus comprising:
   a reception unit for receiving the 2D image including a still image or a moving picture from an external device and receiving mesh shapes and depth information of a mesh map which are edited by a user;
   a screen reference unit for displaying the 2D image and the mesh map;
   an information management unit for managing the mesh shapes and the depth information of the mesh map that is edited by the user in accordance with shapes of a displayed image;
   a calculation unit for calculating relative depth information of the 2D image by calculating an average relative depth value for each pixel of the 2D image by calculating:
      an x-coordinate value and a y-coordinate value of each corner of the mesh map;
      a distance rate from each pixel to each corner of the mesh map;
      a z-coordinate depth value for each corner of the mesh map based on the mesh map edited by the user;
      product values of inverse-proportionally multiplying the z-coordinate depth value of each corner of the mesh map by the distance rate of each corner of the mesh map from the pixel; and
      an average of the product values; and
   a stereoscopic image generation unit for generating a stereoscopic image file by using the calculated relative depth information of the 2D image.

2. The apparatus of claim 1, wherein the screen reference unit displays the 2D image and the mesh map by overlapping the 2D image and the mesh map.

3. The apparatus of claim 1, wherein the screen reference unit determines whether a virtual three-dimensional (3D) display device is included in a computer, and generates a stereoscopic image by applying the mesh shapes and the depth information of the mesh map that is being currently edited, to the 2D image and displays the stereoscopic image and the mesh map by overlapping the stereoscopic image and the mesh map.

4. An apparatus for generating a stereoscopic image from a two-dimensional (2D) image by using a mesh map, the apparatus comprising:
  a reception unit for receiving the 2D image including a still image or a moving picture from an external device and receiving mesh shapes and depth information of a mesh map, which are edited by a user;
  a screen reference unit for generating a stereoscopic image by applying the mesh shapes and the depth information of the mesh map that is being currently edited, to the 2D image and displaying the stereoscopic image and the mesh map by overlapping the stereoscopic image and the mesh map;
  an information management unit for managing the mesh shapes and the depth information of the mesh map that is edited by the user in accordance with shapes of a displayed image;
  a calculation unit for calculating relative depth information of the 2D image by calculating an average relative depth value for each pixel of the 2D image by calculating:
    an x-coordinate value and a y-coordinate value of each corner of the mesh map;
    a distance rate from each pixel to each corner of the mesh map;
    a z-coordinate depth value for each corner of the mesh map based on the mesh map edited by the user;
    product values of inverse-proportionally multiplying the z-coordinate depth value of each corner of the mesh map by the distance rate of each corner of the mesh map from the pixel; and
    an average of the product values; and
  a stereoscopic image generation unit for generating a stereoscopic image file by using the calculated relative depth information of the 2D image.

5. The apparatus of claim 4, wherein the information management unit automatically modifies the mesh shapes of a neighboring image and automatically calculates the depth information of meshes included in the mesh map of the neighboring image in accordance with differences between the neighboring image and a current image, based on the mesh shapes and the depth information of the edited mesh map of the current image, if the received 2D image is a moving picture.

6. The apparatus of claim 5, wherein the information management unit stores and manages the mesh shapes and the depth information including positions and depth values of four corners of meshes of the edited mesh map.

7. The apparatus of claim 4, wherein the stereoscopic image generation unit generates a left-eye-view image by moving pixels of a right-eye-view image horizontally in accordance with the calculated relative depth information, to the right side of the computer screen if the information of the pixel is positive, and generates the stereoscopic image file by alternately arranging pixel lines of the left-eye-view image and the right-eye-view image.

8. The apparatus of claim 7, wherein the stereoscopic image generation unit generates the left-eye-view image by moving pixels of the right-eye-view image horizontally in accordance with the calculated relative depth information, to the left side of the computer screen if the information of the pixel is negative, and generates the stereoscopic image file by alternately arranging pixel lines of the left-eye-view image and the right-eye-view image.

9. The apparatus of claim 4, wherein the stereoscopic image generation unit generates a left-eye-view image by moving pixels of a right-eye-view image horizontally in accordance with the calculated relative depth information, to the right side of the computer screen if the information of the pixel is positive, and generates the stereoscopic image file that corresponds to the left-eye-view image.

10. The apparatus of claim 9, wherein the stereoscopic image generation unit generates the left-eye-view image by moving pixels of the right-eye-view image horizontally in accordance with the calculated relative depth information, to the left side of the computer screen if the information of the pixel is negative, and generates the stereoscopic image file that corresponds to the left-eye-view image.

11. The apparatus of claim 4, wherein the reception unit receives the 2D digital image including a still image or a moving picture from an external device and receives the mesh shapes and the depth information of the mesh map which are edited in accordance with shapes of the displayed image.

12. A method of generating a stereoscopic image from a two-dimensional (2D) image by using a mesh map, the method comprising:
  receiving the 2D image;
  displaying the 2D image and a mesh map;
  editing mesh shapes and depth information of the mesh map by a user in accordance with shapes of a displayed image;
  calculating relative depth information of the 2D image by calculating an average relative depth value for each pixel of the 2D image by calculating:
    an x-coordinate value and a y-coordinate value of each corner of the mesh map;
    a distance rate from each pixel to each corner of the mesh map;
    a z-coordinate depth value for each corner of the mesh map based on the mesh map edited by the user;
    product values of inverse-proportionally multiplying the z-coordinate depth value of each corner of the mesh map by the distance rate of each corner of the mesh map from the pixel; and
    an average of the product values; and
  generating a stereoscopic image file by using the calculated relative depth information of the 2D image.

13. The method of claim 12, further comprising displaying the 2D image and the mesh map by overlapping the 2D image and the mesh map.

14. The method of claim 12, further comprising:
  determining whether a virtual three-dimensional (3D) display device is included in a computer; and
  generating a stereoscopic image by applying the mesh shapes and the depth information of the mesh map that is being currently edited, to the 2D image and displaying the stereoscopic image and the mesh map by overlapping the stereoscopic image and the mesh map.

15. A method of generating a stereoscopic image from a two-dimensional (2D) image by using a mesh map, the method comprising:
  receiving the 2D image;
  generating a stereoscopic image by applying mesh shapes and depth information of a mesh map that is being currently edited, to the 2D image and displaying the stereoscopic image and the mesh map by overlapping the stereoscopic image and the mesh map;
  editing the mesh shapes and the depth information of the mesh map by a user in accordance with shapes of a displayed image;

calculating relative depth information of the 2D image by
   calculating an average relative depth value for each pixel
   of the 2D image by calculating:
      an x-coordinate value and a y-coordinate value of each
         corner of the mesh map;
      a distance rate from each pixel to each corner of the mesh
         map;
      a z-coordinate depth value for each corner of the mesh
         map based on the mesh map edited by the user;
      product values of inverse-proportionally multiplying the
         z-coordinate depth value of each corner of the mesh
         map by the distance rate of each corner of the mesh
         map from the pixel; and
      an average of the product values; and
   generating a stereoscopic image file by using the calculated
      relative depth information of the 2D image.

16. The method of claim 15, further comprising automatically modifying the mesh shapes of a neighboring image and automatically calculating the depth information of meshes included in the mesh map of the neighboring image in accordance with differences between the neighboring image and a current image, based on the mesh shapes and the depth information of the edited mesh map of the current image, if the received 2D image is a moving picture.

17. The method of claim 15, wherein the editing of the mesh map comprises:
   editing the mesh shapes and the depth information of the
      mesh map by the user in accordance with the shapes of
      the displayed image; and
   storing and managing the mesh shapes and the depth information including positions and depth values of four corners of meshes of the edited mesh map.

18. The method of claim 15, wherein the generating of the stereoscopic image file comprises:
   generating a left-eye-view image by moving pixels of a
      right-eye-view image horizontally in accordance with
      the calculated relative depth information, to the right
      side of the computer screen if the information of the
      pixel is positive; and
   generating the stereoscopic image file by alternately
      arranging pixel lines of the left-eye-view image and the
      right-eye-view image.

19. The method of claim 18, wherein the generating of the stereoscopic image file comprises:
   generating the left-eye-view image by moving pixels of the
      right-eye-view image horizontally in accordance with
      the calculated relative depth information, to the left side
      of the computer screen if the information of the pixel is
      negative; and
   generating the stereoscopic image file by alternately
      arranging pixel lines of the left-eye-view image and the
      right-eye-view image.

20. The method of claim 15, wherein the generating of the stereoscopic image file comprises:
   generating a left-eye-view image by moving pixels of a
      right-eye-view image horizontally in accordance with
      the calculated relative depth information, to the right
      side of the computer screen if the information of the
      pixel is positive; and
   generating the stereoscopic image file that corresponds to
      the left-eye-view image.

21. The method of claim 20, wherein the generating of the stereoscopic image file comprises:
   generating the left-eye-view image by moving pixels of the
      right-eye-view image horizontally in accordance with
      the calculated relative depth information, to the left side
      of the computer screen if the information of the pixel is
      negative; and
   generating the stereoscopic image file that corresponds to
      the left-eye-view image.

22. The method of claim 15, wherein the receiving of the 2D image comprises receiving the 2D digital image including a still image or a moving picture from an external device.

23. A non-transitory computer readable recording medium having recorded thereon a computer program for executing functions of a stereoscopic image generation apparatus comprising a processor, the functions comprising:
   receiving a two-dimensional (2D) image;
   displaying the 2D image and a mesh map by overlapping
      the 2D image and the mesh map;
   editing mesh shapes and depth information of the mesh
      map by a user in accordance with shapes of a displayed
      image;
   calculating relative depth information of pixels included in
      the 2D image by calculating an average relative depth
      value for each pixel of the 2D image by calculating:
      an x-coordinate value and a y-coordinate value of each
         corner of the mesh map;
      a distance rate from each pixel to each corner of the mesh
         map;
      a z-coordinate depth value for each corner of the mesh
         map based on the mesh map edited by the user;
      product values of inverse-proportionally multiplying the
         z-coordinate depth value of each corner of the mesh
         map by the distance rate of each corner of the mesh
         map from the pixel; and
      an average of the product values; and
   generating a stereoscopic image file by using the calculated
      relative depth information of the 2D image.

24. The non-transitory computer readable recording medium of claim 23, wherein the functions further comprise:
   determining whether a virtual three-dimensional (3D) display device is included in a computer; and
   generating a stereoscopic image by applying the mesh
      shapes and the depth information of the mesh map that is
      being currently edited, to the 2D image and displaying
      the stereoscopic image and the mesh map by overlapping the stereoscopic image and the mesh map, if the
      virtual 3D display device is included in the computer.

25. A non-transitory computer readable recording medium having recorded thereon a computer program for executing functions of a stereoscopic image generation apparatus comprising a processor, the functions comprising:
   receiving a two-dimensional (2D) image;
   generating a stereoscopic image by applying mesh shapes
      and depth information of a mesh map that is being currently edited, to the 2D image and displaying the stereoscopic image and the mesh map by overlapping the
      stereoscopic image and the mesh map;
   editing the mesh shapes and the depth information of the
      mesh map by a user in accordance with shapes of a
      displayed image;
   calculating relative depth information of the 2D image by
      calculating an average relative depth value for each pixel
      of the 2D image by calculating:
      an x-coordinate value and a y-coordinate value of each
         corner of the mesh map;
      a distance rate from each pixel to each corner of the mesh
         map;
      a z-coordinate depth value for each corner of the mesh
         map based on the mesh map edited by the user;

product values of inverse-proportionally multiplying the z-coordinate depth value of each corner of the mesh map by the distance rate of each corner of the mesh map from the pixel; and an average of the product values; and generating a stereoscopic image file by using the calculated relative depth information of the 2D image.

26. The non-transitory computer readable recording medium of claim 25, wherein the functions further comprise automatically modifying the mesh shapes of a neighboring image and automatically calculating the depth information of four corners of meshes included in the mesh map of the neighboring image in accordance with differences between the neighboring image and a current image, based on the mesh shapes and the depth information of the edited mesh map of the current image, if the received 2D image is a moving picture.

* * * * *